W. F. ECKERT.
COUPLING.
APPLICATION FILED FEB. 8, 1915.
1,189,802. Patented July 4, 1916.
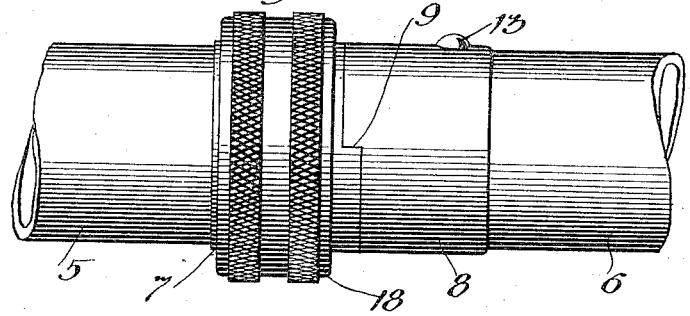
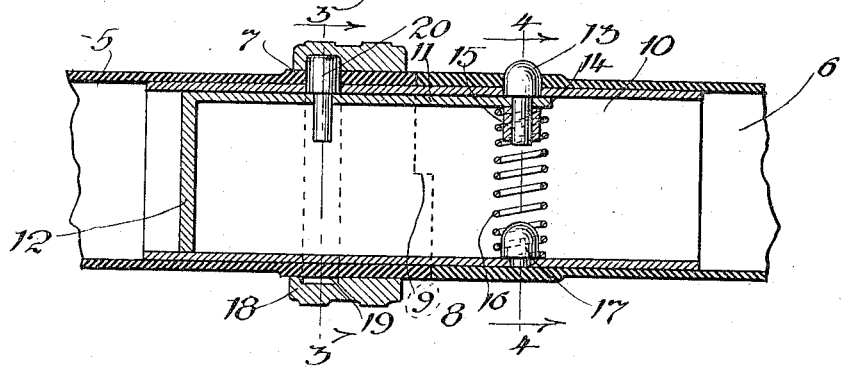
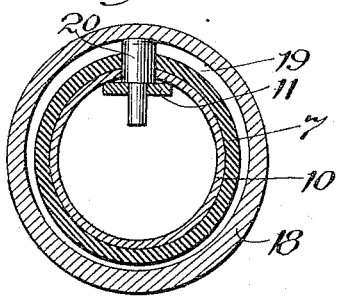
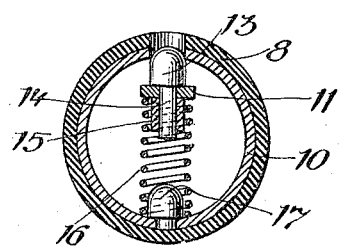
Witnesses:
Frank S. Blanchard
Thomas O. Banning
Inventor:
William F. Eckert.
By Banning & Banning
Attorneys.

UNITED STATES PATENT OFFICE.

WILLIAM F. ECKERT, OF CHICAGO, ILLINOIS, ASSIGNOR TO FRIGID FLUID COMPANY, OF CHICAGO, ILLINOIS, A CORPORATION OF ILLINOIS.

COUPLING.

1,189,802.  Specification of Letters Patent.  Patented July 4, 1916.

Application filed February 8, 1915. Serial No. 6,813.

*To all whom it may concern:*

Be it known that I, WILLIAM F. ECKERT, a citizen of the United States, residing at Chicago, Cook county, Illinois, have invented certain new and useful Improvements in Couplings, of which the following is a specification.

The present invention has reference to certain improvements in couplings such as may be used for joining together sections of tubing, shafting and the like.

The main objects of the invention are to provide a coupling which will very securely join the parts together so that they will be forced to rotate together, but, nevertheless, to so construct the couplings that the two sections of tubing or shafting may be readily disengaged by a very simple and convenient operation.

Another object is to so construct the coupling that the sections will be held together firmly not only for the purpose of coupling them to rotate together, but also to prevent them from becoming disengaged by separation lengthwise.

Other objects and uses will appear from a detailed description of the invention which consists in the features of construction and combinations of parts hereinafter described and claimed.

In the drawings: Figure 1 shows a side elevation of the two sections of tubing joined together, the coupling being in the position it occupies under such conditions; Fig. 2 is a cross section corresponding to Fig. 1; Fig. 3 is a section taken on the line 3—3 of Fig. 2 looking in the direction of the arrows; and Fig. 4 is a section taken on the line 4—4 of Fig. 2 looking in the direction of the arrows, the coupling pin being forced down preparatory to disengagement.

In the drawings I have designated the two sections of tubing by the numerals 5 and 6. Their end portions are preferably upset to provide the thickened portions 7 and 8 respectively, the additional thickness thus secured serving to give added strength to the point of junction. Furthermore the end portions where they come together are preferably shouldered, as at 9, such shoulders serving to lock the parts very firmly together so as to enable them to transmit heavy torsional forces.

Extending from the end portion of the section 5 I provide a collar 10 of reduced diameter, said collar being of proper size to receive the section 6 and aline the same with respect to the section 5. The collar 10 is preferably secured to the section 5 by riveting, brazing or in some similar manner. A spring arm 11 is mounted within the collar and may be pressed downwardly toward the center thereof. As illustrated, this spring arm takes the form of one arm of an L-shaped member, the other arm 12 of which is rigidly secured within the collar. By this means the spring arm normally stands in the position illustrated in Fig. 2. Its end portion carries a lock pin 13. This pin has the neck 14, the lower end of which carries the block 15 so that when the arm 11 is forced down the pin 13 will also be drawn down. A spring 16 has one end in engagement with the block 15 and its other end surrounds another block 17 on the other side of the collar. This spring assists in carrying the pin 13 outward into the position shown in Fig. 2.

When the parts are locked together the pin 13 extends through openings in the collar 10 and in the enlarged end portion of the section 6, thereby locking these parts rigidly together. This serves also to lock the two tube sections together against separation endwise, and assists in locking the two sections together so as to resist torsional displacement. When it is desired to uncouple the parts the pin 13 is to be lowered. This can be done by pressing down on said pin, but I have provided a simple convenient means for accomplishing the same result in a better way. In the arrangement illustrated this means takes the form of a ring 18 surrounding the enlarged end portion 7 of the section 5, said ring being provided with an eccentric slot or groove 19. The arm 11 carries a pin 20 which seats in said slot and is so proportioned that when the ring stands in that position where its greatest eccentricity coincides with the block 20 said block can rise sufficiently to permit the arm 11 to fully restore and permit the pin 13 to lock the parts together. On the other hand, if the ring be rotated in either direction the eccentricity of the slot 19 will force down the block 20, thereby also lowering the arm 11 and causing the pin 13 to become disengaged.

While I have herein shown and described only a single embodiment of my invention still it will be understood that I am in no wise limited to such embodiment except as I may so limit myself in the claims.

I claim:

1. In combination with a pair of tubular members having their adjacent end portions of complementary formation and equal inner diameter, one of said members being a driver and the other a follower, a tubular extension on the driver of diameter to seat nicely into the follower and support the same, a resilient arm having its inner end rigidly connected with respect to the driver and its outer end free to be deflected inwardly, a button on the outer end of said arm, there being an opening in the follower adapted to receive said button, a ring rotatably mounted on the outer surface of the driver, there being a cam slot on the inner face of said ring, and a part on the resilient arm entered into said cam slot and engaging the same, whereby when said ring is rotated, the arm is deflected for the purpose of carrying the button inwardly out of engagement from the follower, substantially as described.

2. In combination with a pair of tubular members having complementary end portions, one of said members being a driver and the other a follower, an extension on the driver adapted to seat into the follower and support the same, a resilient member having one portion rigid with respect to the driver and another portion adapted to lie beneath the follower and flexible with respect to the same, a button on said second mentioned portion, there being complementary openings in the extension and in the follower, said button being adapted to enter both of said openings for locking purposes, a ring rotatably mounted on the driver, there being a cam surface on the inner face of said ring, and a part on the resilient member adapted to engage said cam surface for the purpose specified.

WILLIAM F. ECKERT.

Witnesses:
 THOMAS A. BANNING, Jr.,
 WM. P. BOND.

Copies of this patent may be obtained for five cents each, by addressing the "Commissioner of Patents, Washington, D. C."